(12) United States Patent
Satish et al.

(10) Patent No.: US 8,239,915 B1
(45) Date of Patent: Aug. 7, 2012

(54) ENDPOINT MANAGEMENT USING TRUST RATING DATA

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1386 days.

(21) Appl. No.: 11/427,938

(22) Filed: Jun. 30, 2006

(51) Int. Cl.
*H04L 29/06* (2006.01)

(52) U.S. Cl. .......... 726/1; 726/3; 726/4; 726/5; 713/166

(58) Field of Classification Search ............... 726/1, 4; 713/166
See application file for complete search history.

(56) References Cited

U.S. PATENT DOCUMENTS

| | | | |
|---|---|---|---|
| 5,440,723 A | 8/1995 | Arnold et al. | |
| 5,987,524 A | 11/1999 | Yoshida et al. | |
| 6,055,637 A * | 4/2000 | Hudson et al. | 726/20 |
| 6,073,242 A | 6/2000 | Hardy et al. | |
| 6,393,484 B1 | 5/2002 | Massarani | |
| 6,490,679 B1 | 12/2002 | Tumblin et al. | |
| 6,499,110 B1 | 12/2002 | Moses et al. | |
| 7,185,359 B2 | 2/2007 | Schmidt et al. | |
| 7,269,851 B2 | 9/2007 | Ackroyd | |
| 7,302,706 B1 | 11/2007 | Hicks et al. | |
| 7,308,496 B2 | 12/2007 | Yeager et al. | |
| 7,337,224 B1 | 2/2008 | Van Horne, III et al. | |
| 7,360,237 B2 | 4/2008 | Engle et al. | |
| 7,370,358 B2 | 5/2008 | Ghanea-Hercock | |
| 7,496,348 B2 | 2/2009 | Srey et al. | |
| 7,617,533 B1 | 11/2009 | Hernacki | |
| 7,665,126 B2 | 2/2010 | Simon et al. | |
| 7,694,343 B2 | 4/2010 | Sobel et al. | |
| 7,712,138 B2 | 5/2010 | Zobel et al. | |
| 7,748,038 B2 | 6/2010 | Olivier et al. | |
| 7,774,845 B2 | 8/2010 | Shipman | |
| 7,913,303 B1 | 3/2011 | Rouland et al. | |
| 8,091,134 B2 | 1/2012 | Benton et al. | |
| 2002/0025031 A1 | 2/2002 | Maeda et al. | |
| 2002/0078377 A1* | 6/2002 | Chang et al. | 713/201 |
| 2005/0091538 A1 | 4/2005 | Hoche et al. | |
| 2005/0188268 A1* | 8/2005 | Verbowski et al. | 714/37 |
| 2006/0015722 A1* | 1/2006 | Rowan et al. | 713/166 |
| 2006/0130139 A1 | 6/2006 | Sobel et al. | |

(Continued)

OTHER PUBLICATIONS

Blaze et al "The Role of Trust Management in Distributed Systems Security" Lecture Notes in Computer Science 1999 Copyright Springerlink, vol. 1603/1999, 185-210.*

(Continued)

*Primary Examiner* — Taghi Arani
*Assistant Examiner* — Jason Lee
(74) *Attorney, Agent, or Firm* — Fenwick & West LLP (57) ABSTRACT

Techniques are disclosed for implementing dynamic endpoint management. In accordance with one embodiment, whenever an endpoint joins a managed network for the first time, or rejoins that network, a local security module submits a list of applications (e.g., all or incremental) to a security server. The server validates the list and sends back a rule set (e.g., allow/block rules and/or required application security settings) for those applications. If the server has no information for a given application, it may further subscribe to content from a content provider or service. When the server is queried regarding an unknown application, the server sends a query to the service provider to obtain a trust rating for that unknown application. The trust rating can then be used to generate a rule set for the unknown application. Functionality can be shifted from server to client, and vice-versa if so desired.

18 Claims, 4 Drawing Sheets

U.S. PATENT DOCUMENTS

2006/0230437 A1 10/2006 Alexander Boyer et al.
2006/0259960 A1 11/2006 Kondo
2007/0101405 A1* 5/2007 Engle et al. ............ 726/4
2007/0143851 A1* 6/2007 Nicodemus et al. ............ 726/25
2009/0119681 A1 5/2009 Bhogal et al.

OTHER PUBLICATIONS

Nagaratnam et al "The Security Architecture for Open Grid Services" version 1 Jul. 17, 2002, pp. 1-31, IBM Corporation, Research Triangle Park NC 27703.*

Langston, R., "Network Access Control Technologies and Sygate Compliance on Contact," Sygate Technologies, Inc., 2005, [online] [Retrieved on Jul. 31, 2006] Retrieved from the Internet<URL:http://www.softwarespectrum.com/symantec/docs/WP-Sygate-Network-Access-Control.pdf>.

"BigFix® Announces Support for Network Access Protection Technology from Microsoft," BigFix, Inc., Jul. 13, 2004, [online] [Retrieved on Mar. 31, 2006] Retrieved from the Internet<URL:http://www.bigfix.com/press/news/pr_071304.html>.

BigFix Client Compliance: Cisco NAC, BigFix, Inc., Apr. 25, 2005, [online] [Retrieved on Mar. 31, 2006] Retrieved from the Internet<URL:http://www.satisnet.co.uk/downloads/bigfix/bigfix_cisco_nac.pdf>.

"BigFix® Closes the "Scan & Block" Remediation Gap with Expanded Endpoint Security Offerings," BigFix, Inc., Oct. 7, 2004, [online] [Retrieved on Mar. 31, 2006] Retrieved from the Internet<URL:http://www.bigfix.com/press/news/pr_100704.html>.

Walder, Bob, "Intrusion Detection Systems," TechOnLine, 1996-2006, [online] [Retrieved on Mar. 31, 2006] Retrieved from the InternetURL:http://www.techonline.com/community/ed_resource/feature_article/20645>.

U.S. Appl. No. 10/895,780, filed Jul. 20, 2004, Greg D. Vogel.

* cited by examiner

ENDPOINT MANAGEMENT USING TRUST RATING DATA

RELATED APPLICATIONS

This application is related to U.S. application Ser. No. 11/270,918, filed Nov. 9, 2005, titled "Dynamic Endpoint Compliance Policy Configuration." This application is also related to U.S. application Ser. No. 11/394,846, filed Mar. 31, 2006, titled "Social Trust Based Security model." Each of these applications is herein incorporated in its entirety by reference.

FIELD OF THE INVENTION

The invention relates to computer security, and more particularly, to endpoint management techniques.

BACKGROUND OF THE INVENTION

A client compliancy system is used to gate access to a protected network, such that only clients that are in compliance with a policy are allowed access to the protected network. Clients that are not in compliance are typically assigned to a quarantine network and provided with some remediation mechanism that should allow them to become compliant. Determination of a client's compliance can be done on the client itself, external to the client, or in a combination of these.

Endpoint compliance solutions help customers manage client security by ensuring that all clients are using current signatures, components, patches, and security policy. However, the endpoint compliance solution itself requires management. In particular, the "manager" (e.g., administrator/IT) must define and configure the required compliance policies. This configuration process is ongoing and difficult, particularly as more client security products are deployed, and as those products are updated. In addition, if the manager allows administrative privileges to a user, then the manager has very little control over what arbitrary or unknown applications the user can or cannot run on the endpoint. Being too restrictive results in over-management or in a situation where the user is not able to perform his task, both such results being unacceptable. Another problem is the impracticality associated with presetting an application list (both known good/bad and unknown) on an endpoint. In particular, it is difficult at best to anticipate what applications will and will not be required at a given endpoint in the future (particularly with regard to new and/or improved applications released after the preset date).

What is needed, therefore, are techniques for implementing effective endpoint management techniques.

SUMMARY OF THE INVENTION

One embodiment of the present invention provides a method for endpoint management. Such a method can be carried out, for example, by a security service providing endpoint management to one or more customers. The method includes receiving an endpoint request to join a managed network, the request identifying an application at that endpoint. In response to the application not being represented in a compliance policy database, the method further includes querying a content provider service to obtain one or more application factors that can be used to compute a trust rating for the application (and/or a pre-computed trust rating for the application), and generating one or more security rules for the application based on the trust rating, the one or more security rules for use in a managed endpoint compliance scheme. In response to the application being represented in the compliance policy database, the method may include retrieving one or more security rules associated with that application from the compliance policy database. The method may include compiling the one or more security rules into a response, and sending the response to the requesting endpoint. In one particular case, the request identifies a plurality of applications, and one or more security rules are generated for each application. In another particular case, the endpoint is joining the managed network for the first time, and the request identifies all applications at the endpoint. In another particular case, the endpoint is rejoining the managed network after having been disconnected, and the request identifies only applications that have changed, including new applications. Note that the use of "only" is intended to modify the type of application data that is reported (i.e., only changed applications, as opposed to all applications), and is not intended to restrict other types of information that can be specified in the request. In another particular case, querying a content provider service to obtain one or more application factors includes polling a peer group of the endpoint and receiving responses from the peer group. In another particular case, querying a content provider service to obtain one or more application factors includes querying a storage that catalogues applications by unique ID and has one or more application factors associated with each ID. The storage may be, for example, either local or remote, or a combination a local and remote storages. Another embodiment of the present invention provides a machine-readable medium (e.g., one or more compact disks, diskettes, servers, memory sticks, or hard drives) encoded with instructions, that when executed by one or more processors, cause the processor to carry out a process for endpoint management. This process can be, for example, similar to or a variation of the method described here.

Another embodiment of the present invention provides a method for endpoint management. Such a method can be carried out, for example, at a managed endpoint. The method includes generating an endpoint request to join a managed network, the request identifying an endpoint application. The method continues with sending the endpoint request for analysis, the analysis including use of a content provider service to obtain one or more application factors that can be used to compute a trust rating for the application, and/or a pre-computed trust rating for the application. The method continues with receiving one or more security rules responsive to the endpoint request, with at least one of the security rules having been generated based on the trust rating, the one or more security rules for use in a managed endpoint compliance scheme. In one particular case, the request identifies all endpoint applications. In another particular case, the request identifies only applications that have changed, including new applications (previous discussion with regard to "only" equally applies here). In another particular case, the analysis includes use of the content provider service in response to the application not being represented in a compliance policy database. In one such case, and in response to the application being represented in the compliance policy database, the method further includes receiving from the compliance policy database one or more security rules responsive to the endpoint request. In another particular case, the request identifies a plurality of applications, and one or more security rules are received for each application. Another embodiment of the present invention provides a machine-readable medium (e.g., one or more compact disks, diskettes, servers, memory sticks, or hard drives) encoded with instructions, that when executed by one or more processors, cause the processor to carry out a process for endpoint management. This process can be, for example, similar to or a variation of the method described here.

Another embodiment of the invention provides a system for endpoint management. The system includes a server for receiving an endpoint request to join a managed network, the request identifying an application at that endpoint. The system further includes a communicator and a generator, which operate in response to the application not being represented in a compliance policy database. In particular, the communicator is for querying a content provider service to obtain one or more application factors that can be used to compute a trust rating for the application, and/or a pre-computed trust rating for the application. The generator is for generating one or more security rules for the application based on the trust rating, the one or more security rules for use in a managed endpoint compliance scheme. In one particular case, and in response to the application being represented in the compliance policy database, the communicator is further configured for retrieving one or more security rules associated with that application from the compliance policy database. The system may includes means for compiling the one or more security rules into a response, wherein the server is further configured for sending the response to the requesting endpoint. In another particular case, the querying of a content provider service performed by the communicator includes at least one of polling a peer group of the endpoint and querying a storage that catalogues applications by unique ID and has one or more application factors associated with each ID. The system may include a requestor for generating and sending the endpoint request for analysis (the analysis including use of the content provider service), and an endpoint receiver for receiving the one or more security rules. In another particular case, the request identifies a plurality of applications, and one or more security rules are generated for each one. The system functionality can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. The system can be implemented in a client-server environment, with some endpoint management functionality carried out, for example, at one more servers and some at one or more customer sites, or all at the server-side or all at the customer side.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Techniques are disclosed for implementing dynamic endpoint management. Such endpoint management solutions are easy to deploy and maintain, relative to conventional endpoint compliance solutions, in that up-to-date application information for each endpoint are automatically provided by the customer site. Thus, the security service is capable of enforcing what applications users can or cannot run on the managed endpoints without having to have a static white-list or black-list of applications.

General Overview

Endpoints run trusted security components and use certain security settings in order to comply with security policies of the network on which they reside and operate. In accordance with one embodiment of the present invention, whenever an endpoint joins a managed network for the first time, a local security module submits a list of applications (e.g., with path, name, and hashes in a DNS or equivalent query) to a security server. The server validates the list and sends back a rule set (e.g., allow/block rules and/or required application security settings) for those applications. In addition, every time an endpoint disconnects from the managed network and reconnects, its local security module submits any changes in the application set to the server. The server then generates and sends any incremental rules (e.g., allow, deny, and security setting rules). Default operating system components, binaries, and other known good executables can be exempted from the validation process or otherwise ignored, if so desired. Server queries and responses can be signed to ensure integrity (e.g., by keys managed and granted by the user authentication server upon logon). In any case, the server is dynamically updated by self-reporting endpoints, and enables manager review the installed endpoint applications and the corresponding rule set at any given time.

If the server has no information for a given application, it may further subscribe to content from a content provider or service. In one such embodiment, when the server is queried regarding an unknown application, the server sends a query (including the unknown application) to the service provider to obtain a trust rating for that unknown application. The trust rating can then be used to generate a rule set (e.g., allow/block rules and/or required application security settings) for the unknown application. The application list at the server can be periodically updated with such $3^{rd}$ party rating info as well. Alternatively, or in addition to, the network manager or other internal entity (e.g., users) may also provide trust ratings on the basis of their security policies or business objectives. Numerous factors can be considered in developing a trust rating (e.g., reputation of vendor that produces the application, or lack thereof; whether or not the application has successfully executed in a quarantine environment without negative result; public commentary on the application harvested from Internet sources such as electronic bulletin boards, chat rooms, and security threat watch dog sites; and real-time threat data provided by one or more security information services such as Symantec DeepSight Alert Service and other such early warning services that deliver timely and actionable security alerts). With such information in hand, the server can compute security rules for otherwise unknown applications. In addition, the security service ensures that suspect applications are prevented from running on the endpoint. The user may have the option of running such applications only as a low privileged user, on a restricted (reduced resource) network.

System Architecture

Figure 1:
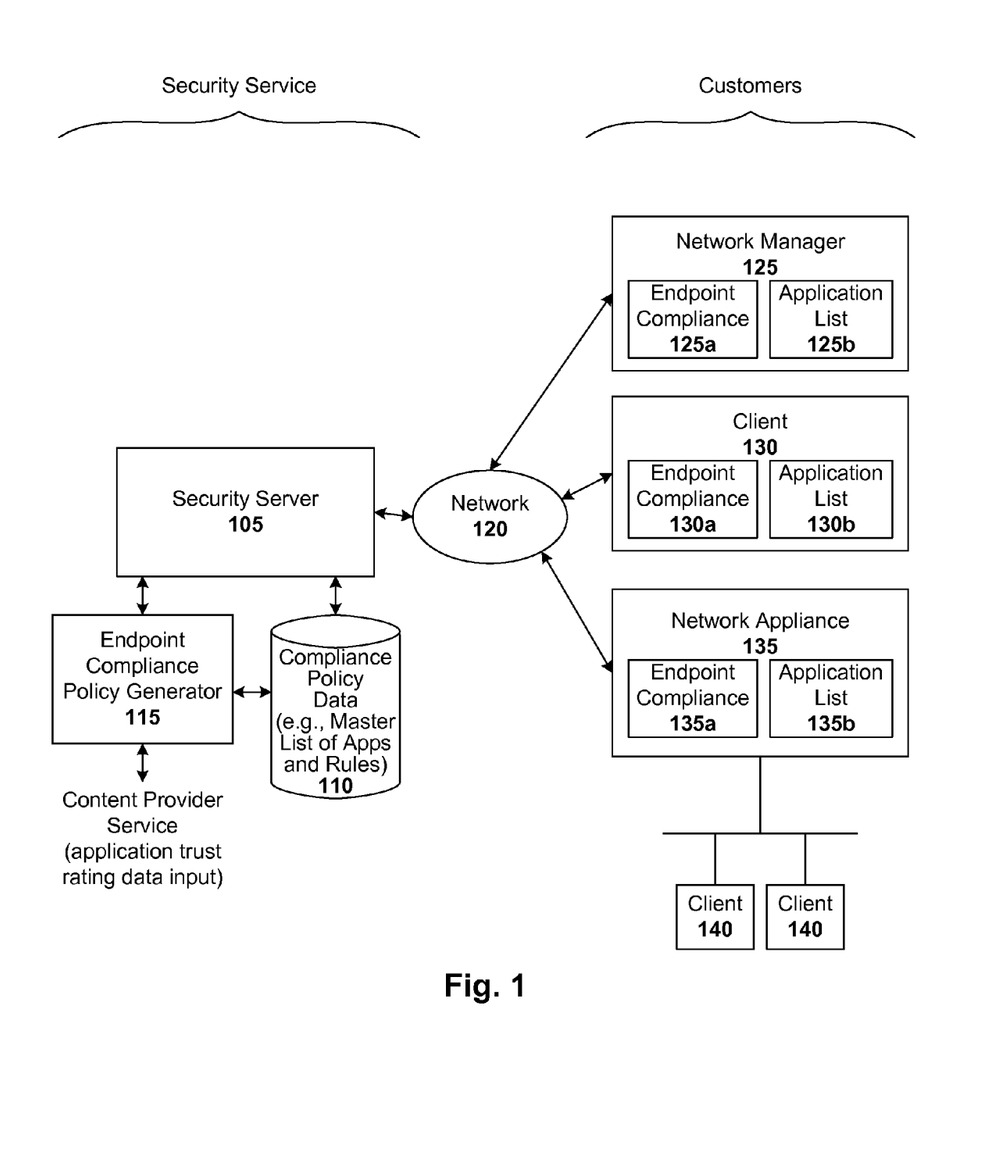
FIG. 1 is a block diagram of an endpoint management system configured in accordance with an embodiment of the present invention.

FIG. 1 is a block diagram of an endpoint management system configured in accordance with an embodiment of the present invention.

As can be seen, the system includes a security service and one or more customers (in this example, only one customer site is shown). The security service includes a security server 105, a compliance policy data module 110, and an endpoint compliance policy generator 115. The security service also subscribes to a content provider service that provides application trust rating data to the endpoint compliance policy generator 115. The security service is communicatively coupled via network 120 to a customer, which in this example embodiment includes a network manager 125, a client 130, and a network appliance 135 coupled to an internal network that includes a number of clients 140. Although the discussion herein focuses on endpoint management, other compliance system attributes, such as compliance policy configuration, detection of malicious code/activity, and remedial capability, will be apparent in light of this disclosure. The illustrated configuration of the example customer site was selected to demonstrate features and flexibility of the endpoint management techniques described herein, and the present invention is not intended to be limited to any one particular site configuration or subset of site configurations.

The network 120 may be any type of communications network, such as a local area network (e.g., intranet), wide area network (e.g., Internet), or some combination thereof. Alternatively, the network 120 may be a direct connection between the customer and the security service. In general, communication between the security service and the customer can be implemented via any type of wired and/or wireless connection, using a wide variety of communication protocols (e.g., TCP/IP, HTTP, SMTP, FTP), encodings or formats (e.g., HTML, XML), and protection schemes (e.g., VPN, secure HTTP, SSL). Alternatively, the security service may indirectly communicate with its customers via U.S. mail or other such delivery service, where a processor readable medium (e.g., compact disk or floppy disk) is sent to a customer's street address. This processor readable medium can be encoded with instructions and/or data files that can be loaded, executed and/or otherwise used by the clients and/or network devices at the customer's site.

The security server 105 is provided by a security software vender or other entity, and can include one or more standard computer systems configured to communicate with client computers (network manager 125, client 130, and network appliance 135) via the network 120. For example, the security server 105 can include a web server, FTP server, or other technology that enables the security server 105 to interact with the customer devices via the network 120. The security server 105 may also provide to the customer computing systems, for example, signatures and security code for detecting malicious software and activity. In addition, the security server 105 can provide signatures of exclusions, which are programs, routines, applications, etc that are known to be legitimate in their purpose and operation, or are otherwise trusted.

In one embodiment, the security server 105 provides dynamic endpoint management to the customer, based on endpoint application data self-reported by the computing systems (e.g., network manager 125, client 130, and network appliance 135). The security server 105 can provide customized endpoint compliance policies, for example, in response to requests from a customer endpoint where the request specifies an endpoint application set. Such requests can be sent, for example, at start-up of a new endpoint, once every N hours, or each time a change in applications at a particular endpoint is detected. As can be seen in this embodiment, the endpoint compliance policies are generated by the endpoint compliance policy generator 115, and stored in the compliance policy database 110. The server 105 can then access database 110 to retrieve policies that are relevant to a given customer. Alternatively, or in addition to, the server 105 can receive policies directly from the endpoint compliance policy generator 115 (in real-time, as requests are received). In any case, the endpoint compliance policies are served to the corresponding customer.

As previously explained, the endpoint compliance policy generator module 115 generates the endpoint compliance policies based on the endpoint applications the requesting endpoint has deployed. In one such embodiment, each endpoint compliance policy in the database 110 is categorized by the name of the corresponding application to which it applies. In this sense, the database 110 is a master list of applications and corresponding rules. Each endpoint compliance policy (e.g., an allow/block rule and/or required application security settings) is configured to require the appropriate endpoint security, based on the security service's determination.

Table 1 illustrates example structure and content of the compliance policy data module 110. This example compliance policy data module 110 is configured as a look-up table indexed by application name. For each application, there are one or more applicable rules that would apply to that particular application. Other data facilities and search techniques can be used as well, such as searchable linked lists and databases (e.g., relational and object-oriented). Further, note that not all rules are actually "allow or block rules" per se (e.g., where an application is either allowed to execute at an endpoint or it isn't). For example, the Internet Explorer browser is an application for accessing the Internet, and happens to have various embedded security features or patches to protect its host system. Likewise, operating systems like those provided by Microsoft, Apple, or Linux have primary functions not directly related to security, but may also have features or patches to protect the host system. In addition, products such as word processing, spreadsheet, and presentation applications have a security aspect to them, in that those applications must be properly licensed and used in order to avoid liability under various intellectual property and contract laws. Thus, a "rule" as used herein is not intended to be limited to allow or block rules, but is intended to cover any type of compliance policy that can be associated with an application by the customer and/or the security service. Furthermore, the compliance policies generated by the endpoint compliance policy generator 115 may be computed with security products and/or desired security levels specified by the endpoint user, as discussed in the previously incorporated U.S. application Ser. No. 11/270,918, titled "Dynamic Endpoint Compliance Policy Configuration." Alternatively, the security products and/or security levels can be specified by the security service. In addition, note that policies can be used to exploit other opportunities, such as marketing opportunities (e.g., cross-selling related security products or upgrades), as well as to ensure implementation of a robust endpoint compliance security scheme.

TABLE 1

| Application | Security Level | Endpoint Compliance Policies |
|---|---|---|
| Norton Antivirus 2004 | All | Launch at system start-up<br>Enable automatic update<br>Cross-sell Antivirus 2005 |
| Norton Antivirus 2005 | All | Launch at system start-up<br>Enable automatic update |
| Browser (IE) | Low | Maintain up-to-date security patches |
| Browser (IE) | Medium | Maintain up-to-date security patches<br>Enable pop-up blocker |
| Browser (IE) | High | Maintain up-to-date security patches<br>Enable pop-up blocker<br>Disable active scripting |
| Norton Internet Security 2005 | Low | Launch at system start-up<br>Enable automatic update for all enabled features |
| Norton Internet Security 2005 | Medium | Launch at system start-up<br>Enable automatic update<br>Enable Email Scanning for incoming/outgoing mail |
| Norton Internet Security 2005 | High | Launch at system start-up<br>Enable automatic update<br>Enable Email Scanning for incoming/outgoing mail<br>Enable firewall |
| Microsoft Operating System | All | Maintain up-to-date security patches |
| ZoneAlarm Firewall | Low | Launch at system start-up<br>Enable automatic update for all enabled features<br>Set program control to low |
| ZoneAlarm Firewall | Medium | Launch at system start-up<br>Enable automatic update for all enabled features<br>Set program control to medium<br>Stealth all ports to external network (Internet) |
| ZoneAlarm Firewall | High | Launch at system start-up<br>Enable automatic update for all enabled features<br>Set program control to high<br>Stealth all ports to external network (Internet) |
| MS WORD (and other applications word processor, spreadsheet, and presentation applications) | All | Licensing must be current<br>If unlicensed, then Block<br>If licensed, then Allow |
| Doom (and other such game applications) | All | Block |
| InfectedApp (and other applications known to be infected with malware) | All | Block |
| EmailApp | All | Licensing must be current<br>If unlicensed, then Block<br>If licensed, then Allow |

In the embodiment shown in FIG. 1, the security service also leverages information provided by content provider services when generating compliance policies. In particular, the endpoint compliance policy generator module 115 operates as a communicator which queries one or more content providers and receives application trust rating data (e.g., application factors for use in computing a trust rating, or a pre-computed trust rating based on such factors), which can be used by the module 115 to generate security rules for that application. As previously explained, such application trust rating data provides insight into the trustworthiness of a particular application. In one particular embodiment, the application trust rating data includes (or is based on) any of the following application factors: reputation of vendor/issuer that produces the application (e.g., good reputation favors an allow rule, while a bad or no reputation favors a block rule); reputation of distributor/retailer that distributes/sells the application (e.g., good reputation favors an allow rule, while a bad or no reputation favors a block rule); whether or not the application is signed and if so, with what type of signature (e.g., signed with a robust signature scheme favors an allow rule, while signed with a weak signature scheme or not signed at all favors a block rule); whether or not the application has successfully executed in a quarantine environment without negative result (e.g., no negative result favors an allow rule, while a negative result favors a block rule); public commentary on the application harvested from magazines and trade publications (e.g., publications that dedicates space to reviewing shareware applications), as well as Internet sources such as electronic bulletin boards, chat rooms, and security threat watch dog sites (e.g., no negative comments or recommendations favor an allow rule, while negative comments or recommendations favor a block rule; a related factor is the reputation of the commentary/recommending source); real-time threat data provided by one or more security information services such as Symantec DeepSight Alert Service and other such early warning services that deliver timely and actionable security alerts (e.g., no negative recommendations favor an allow rule, while negative recommendations favor a block rule; a related factor is the reputation of the commentary/recommending security information service); security patch information provided by one or more security patch watchdog services that discuss and/or deliver newly released security patches (e.g., no newly released security patches favor an allow rule, while newly released security patches favor a block rule); the age of the application (e.g., mature applications favor an allow rule, while newer applications favor a block rule); how many users use the application (e.g., many users favor an allow rule, while a small number of users favor a block rule); whether or not the application has networking functionality (e.g., applications with no networking functionality favor an allow rule, while applications having networking functionality favor a block rule); with what service packs is the application compatible (e.g., applications compatible with current service packs favor an allow rule, while applications not compatible with current service packs favor a block rule); whether or not the application is bundled or otherwise installs other software (e.g., applications that do not install other software favor an allow rule, while applications that do install other software favor a block rule); whether or not the application installs kernel modules (e.g., applications that do not install kernel modules favor an allow rule, while applications that do install kernel modules favor a block rule); whether or not the application has any known vulnerabilities susceptible to exploit or has actually been exploited (e.g., applications having no known vulnerabilities favor an allow rule, while applications having known vulnerabilities favor a block rule); whether the application is known to be malicious (if so, then block). Such factors can be used to create allow or deny allow rules as per the policies of an organization that subscribes to such content from one or more content providers. The factors can be summarized, for example, as a 1-5 star reputation rating system, to facilitate computation of a trust rating. In one such embodiment, each factor is associated with a star rating (e.g., with 5 stars being the most favorable, and 1 star being the least favorable. Once all the factors associated with an application are identified (along with their individual star ratings), an overall star rating can be computed for that application by taking the average of the individual factor star ratings (or other statistically sound overall rating computation, such as the modal star rating). A weighting scheme can be used if so desired, to ensure that factors which strongly favor blocking the application from execution are not watered down by a large number of more neutral factors. Likewise, some factors may automatically trigger a block regardless of other factors (e.g., application is known malware or consistently causes computing systems configured as the endpoint to crash). Numerous rating schemes (with and without weighting) can be used here, as will be apparent in light of this disclosure.

In the example shown, the content provider is a service that is external to the security service. In alternative embodiments the content provider can be, for example, a local database or look-up table that catalogues applications by name (e.g., as many as possible on an ongoing basis) and has factors associated with each named application so that actionable rules can be deduced (as previously discussed). In such a case, the content provider service could be implemented on (or otherwise be locally accessible to) server 105. Similarly, the content provider service could be integrated within the policy generator module 115 (which could in turn be integrated into the server 105). Alternatively, or in addition to, content provided by a user (and/or peers of that user) about an application can also be taken into account when computing a trust rating for that application. Likewise, a user can be given the option to provide the trust ratings themselves (including a user-override of trust ratings that are automatically computed based on one or more application factors). Also, the content provider service can be configured to compute the trust ratings based on underlying factors as discussed herein, and to then send the pre-computed trust rating to the module 115 and/or server system 105 (when requested for a given application). Such a configuration would relieve the module 115 and/or server system 105 from having to compute the trust rating. Numerous such configurations can be used here, as will be apparent in light of this disclosure.

In one particular embodiment, the content provider service is implemented by leveraging a "trust circle" as discussed in the previously incorporated U.S. application Ser. No. 11/394, 846. For instance, assume an endpoint at the customer site has received a new executable (e.g., graphix.exe). In accordance with this particular embodiment, the new application is detected and reported to server 105, thereby triggering a request to one or more peers of the endpoint (e.g., polling the trust circle with a broadcast message or other suitable query). Peers can be any other processing systems that can communicate with the endpoint, and which are known to have security-based values (e.g., compliance policies, security tools, and security goals) that are similar to that of the requesting endpoint. The peers can be, for example, specified by the user and/or the security service (e.g., where peers are one or more members of an online community protected and managed by the security service that operates server 105). In this sense, a collection of computers specified by the user and/or protected by a security service (e.g., Symantec Antivirus and LiveUpdate) form a trust circle. Continuing with the example, if a peer determines that it has no information about graphix.exe, it reports such back to the requesting server 105, and also propagates the request to other members included in the trust circle (e.g., whether and to what depth such requests are propagated can be user-configurable). The server 105 gathers the information reported back from the various peers, and compiles the information into a trust rating for the application in question. Note that the endpoint can be configured with a local agent (e.g., endpoint compliance module) to query its trust circle as well (instead of working through the server 105, or in addition to working through the server 105), and either compute the trust rating itself, or send the content reported back by the trust circle to the server 105 for trust rating computation. Continuing with the example, suppose that the user installs graphix.exe based on feedback from the peer group. Shortly thereafter, computer performance becomes sluggish, and/or the user notices that pop-up ads now constantly appear when performing basic system activities. Annoyed by the experience, the user decides to uninstall graphix.exe. The server 105 (or local endpoint agent) can capture user reasons for uninstalling graphix.exe and share the experience with peers. For example, the server 105 (or local endpoint agent) could query the user, via a graphical user interface (e.g., dialogue box, radio buttons, or pull-down menu) as to why he decided to uninstall graphix.exe. The user-provided content of "bad performance" and "pop-ups" combined with "an outdated service pack 1.2" (assume user's computer is not compatible with a more recent "service pack 1.3" that addresses the performance and pop-up issues) could then be shared with other member's of the peer group (and/or server 105) to prevent further use/dissemination of graphix.exe by peers running service pack 1.2 or lower.

The security service, including server 105, compliance policy data module 110, and endpoint compliance policy generator module 115, will be discussed in more detail with reference to FIG. 3.

The customer's site may be configured in numerous ways. The example configuration shown in FIG. 1 can be locally managed and/or monitored (e.g., network manager 125), and can have clients that are directly coupled to the network 120 (client 130), and/or indirectly coupled to the network 120 via a network appliance (e.g., network appliance 135 and clients 140). The network appliance 135 may be, for example, a firewall, hub, router, or custom security device. The network manager 125, client 130, and clients 140 can be any type of computer, such as a computer system (e.g., desktop/lap), personal data assistant (PDA), portable phone, smart phone, and/or any other computing device capable of communicating with devices over a network. Each of these customer devices may include any number of programs and functionality, such as an operating system and applications relevant to the customer's particular enterprise. Any number of clients and/or other network devices may be present at the customer site. Note that the customer site may also include a single machine communicatively coupled to the network 120 (e.g., such as in the case of a household having one computer connected to the Internet), or multiple machines coupled to the network 120 via a router (e.g., such as in the case of a small office or home network, which can be wired or wireless).

In this example configuration, the network manager 125, client 130, and network appliance 135 are each programmed or otherwise configured with an endpoint compliance module 125*a*, 130*a*, and 135*a*, respectively, and application lists 125*b*, 130*b*, and 135*b*, respectively. Other features for these endpoint processing environments will be apparent in light of this disclosure and include, for example, one or more security products (e.g., antivirus, intrusion detection, security patch assessment, Internet security, firewall, file and/or email scanning, and quarantining capability). Some of the security products may also allow for storage of code signatures for comparison with suspect code to identify that code as either being malicious or excluded. Various other functionalities may be included in each endpoint, as desired.

In one embodiment, the endpoint compliance modules 125*a*, 130*a*, and 135*a* are each configured to detect applications (e.g., any executables) at their respective endpoints, and maintain and update an application list 125*b*, 130*b*, and 135*b*, respectively. Alternatively, or in addition to, the user can maintain and/or update the application list 125*b*, 130*b*, and 135b. This application data (whether in its entirety or incrementally as changes occur) can be uploaded or otherwise reported to the security service. For instance, the target applications can be included in a request to join a managed network. The endpoint compliance modules 125a, 130a, and 135a can also be configured to carryout an endpoint compliance scheme implemented with conventional or custom technology, including detection (e.g., intrusion and virus) and remedial capability (e.g., quarantine and upgrade client to be compliant with endpoint compliance policies). The security service can then provide endpoint compliance policies tailored to the application information provided by each endpoint of the customer. The endpoint compliance modules 125a, 130a, and 135a will be discussed in further detail with reference to FIGS. 2 and 4.

The network configuration of the customer site may also include other structure and components not shown in the example of FIG. 1. For instance, the customer network may include an authentication step such as 802.1X or DHCP proxies, where devices that are compliant with endpoint compliance policies are assigned to a protected network and non-compliant devices are assigned to a restricted network. Examples of this type of structure and functionality are described, for example, in U.S. application Ser. No. 10/305,622, titled "Enforcement of Compliance with Network Security Policies," which is herein incorporated in its entirety by reference.

The endpoint compliance policies provided by the security service can be rules-based, which allows them to be created and modified easily. The compliance policies can be used to specify block and allow rules for any number of applications (e.g., allow application to execute or block application from executing). In addition, these policies may include rules related to proper configuration of software on clients and network appliances at the customer's site (e.g., including enabling of particular features such as active scripting and specifying values for settings thereon), installation on customer devices of security software or other software programs (e.g., including anti-virus software and personal firewall software), updates for the security software or other software programs (including versions of the software and operating system security patches), and virus definitions. Additionally, the compliance policies can be configured to enforce software license agreements, where the compliance policies include rules related to installation on the customer devices of licensed software and available site licenses for the licensed software. Rules representing the compliance policies for a given application can be stored electronically for access by any system component that requires them. In the embodiment shown, the rules compliance policies can be stored in (or are otherwise accessible to), for example, in the endpoint compliance modules 125a, 130a, and 135a or in the application lists 125b, 130b, and 135b (along with the corresponding application name or names). In one particular embodiment, application lists 125b, 130b, and 135b are integrated into their respective endpoint compliance modules 125a, 130a, and 135a (as is the case for the example embodiment shown in FIG. 2. The network manager 125 can be responsible for requesting and updating the compliance policies for each of the customer devices. Alternatively, each device can be responsible for requesting and updating its own compliance policies.

In this particular example, the term "module" refers to computer program logic for providing the specified functionality. Note, however, that other modules configured in accordance with the principles of the present invention can be implemented in hardware (e.g., gate-level logic), firmware (e.g., microcontroller configured with I/O capability and a number of embedded routines for carrying out dynamic endpoint compliance policy configuration), or some combination of software, hardware, and/or firmware. It will be understood in light of this disclosure that the modules described herein represent one embodiment of the present invention. Certain embodiments may include other and/or different modules and functionality. In addition, the embodiments may lack modules described herein and/or distribute the described functionality among the modules in a different manner. For example, functionality of the endpoint compliance policy generator 115 can be integrated into the security server 105, as can functionality of the compliance policy data module 110. In one particular embodiment, the modules are stored on a storage (e.g., disk drive) of the corresponding processing environment as executable files, loaded into local memory (e.g., RAM), and executed by a local processor as one or more processes.

Endpoint Compliance Module

Figure 2:
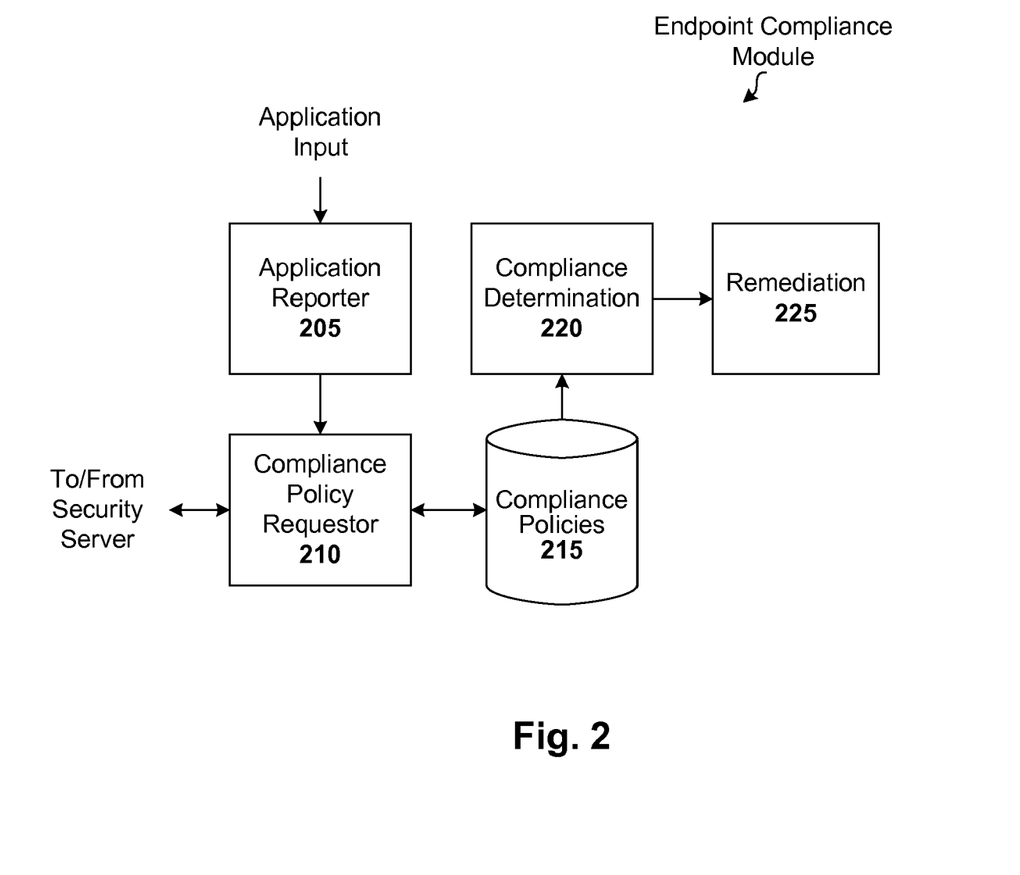
FIG. 2 is a block diagram of an endpoint compliance module configured in accordance with an embodiment of the present invention.

FIG. 2 is a block diagram of an endpoint compliance module configured in accordance with an embodiment of the present invention. This module can be implemented as any of the endpoint compliance modules 125a, 130a, and 135a of FIG. 1, but further integrates the application lists 125b, 130b, and 135b (or variations thereof), as will be discussed in turn. As can be seen, the endpoint compliance module includes an application reporter module 205, a compliance policy requestor module 210, a compliance policies module 215, a compliance determination module 220, and a remediation module 225.

Just as with modules of the security service, each of these modules can be implemented, for example, with software (e.g., C, C++), hardware (e.g., gate-level logic), firmware (e.g., embedded routines executing on one or more microcontrollers of the host device), or some combination thereof. Note that other embodiments may be configured differently than the one shown. For instance, another embodiment only includes the functionality of the application reporter module 205 and the compliance policy requestor module 210. In one such embodiment, the functionality of modules 205 and 210 can be implemented separately as shown, or in a single module. Further, the compliance policies 215 can be stored within that single module, or in a separate database that is accessible to the module or modules (e.g., as shown in FIG. 1). Many variations of the endpoint compliance module shown in FIG. 2 will be apparent in light of this disclosure.

The application reporter module 205 is programmed or otherwise configured to detect applications installed on the local system, and to report those applications to the compliance policy requestor module 210. Detecting applications can be carried out, for example, using a scan operation that searches for executable files (e.g., .exe, .dll, .lib, and .ocx), and generates a search results list each time it runs. Thus, a current search results list can be compared to the previous results list to identify any new applications. The application reporter module 205 may also allow the customer (e.g., network administrator or other customer personnel) to manually input or otherwise provide application information, as well as other information such as the various security products deployed by the customer on that particular host system or network, and the desired security level for each of those products. The module 205 can be configured with a user interface (UI) to facilitate this input process. The UI may include, for instance, a number of pull-down menus including the most commonly used applications, as well as corresponding pull-down menus including desired security levels (e.g., not applicable, low, medium-low, medium, and high) that can be assigned to those various applications. In any case, the detected applications (or a sub-set thereof for incremental updates) are sent to the server 105 via the compliance policy requestor. Alternatively, scanning for applications can be carried out remotely (e.g., by server 105 of the security service) thereby eliminating the need for a local application scanning and reporting function. Various UI and/or data harvesting techniques can be used to collect or otherwise report applications for each endpoint device on the customer network.

In one particular embodiment, the application reporter module 205 is configured as discussed in the previously incorporated U.S. application Ser. No. 11/394,846, which describes an agent for indexing all of the applications that are installed on a computer, for example, by taking hashes of the applications and determining their version numbers, etc. In some such embodiments, the agent is pre-configured with a knowledge of the core components of the operating system on which it is installed. Essential applications, services, etc., that are known good (e.g., digitally signed by a trusted party) are excluded from indexing and monitoring. On an ongoing basis, the agent monitors the target computer for events of interest. For example, every time a new executable appears on the computer (e.g., whether acquired via download or email, copied through network shares, as an edit to an existing application, etc.), the agent captures specific attributes such as where the application came from, its name, full path (or distinguishing portions of the path), and the hash of the executable. The agent also captures system information, such as current operating system version. In some embodiments, if an executable arrives via a trusted channel, such as the Microsoft update service or Symantec LiveUpdate, it is not evaluated and/or is not considered an event of interest. In some embodiments, the application is correlated with events in a system event log, such as any security events, crashes, historical performance issues, etc. The agent keeps the information indexed (aggregating any new information) and ready to be reported, if needed, to the compliance policy requestor module 210.

The compliance policy requestor module 210 is programmed or otherwise configured to receive or otherwise access the current application list for the endpoint, and to communicate those applications (or only new applications not previously reported) to the server 105 (e.g., via network 120). For instance, module 210 can be configured to request endpoint compliance policies and to periodically upload the application list to the security server 105 of the security service. In one embodiment, the application list is uploaded each time the compliance policy requestor module 210 requests endpoint compliance policies from the service (e.g., for first time requests and/or update requests). Alternatively, this application data can be uploaded each time the customer modifies (e.g., adds, deletes, or otherwise updates) applications at the endpoint. A request for updated policies can be made periodically (e.g., every 8 hours or once a day at midnight) and/or anytime changes are made to the customer's environment (e.g., removal/addition of new clients/appliances, replacement of existing clients/appliances, and/or updates to software or configuration of existing clients/appliances).

In any case, communicating application information to the security service allows the security service to know the precise set of applications installed at each of the managed endpoints at any given time, and to generate policy that is appropriate. The policies received from the service (e.g., via module 210 or other endpoint receiver) can then be stored in the compliance policies module 215. Thus, the customer can configure the enforcement points (e.g., firewall, wireless access point, etc) to enforce appropriate traffic controls if compliance to one of these policies is not met.

In the embodiment shown, the compliance determination module 220 can access the endpoint compliance policies stored in the compliance policies module 215, and determine if the host is compliant. This determination can be carried out using conventional or custom compliance determination techniques. If non-compliance if found, then remediation module 225 is configured to effect remedial processing, such as to request the downloading of current malware signatures, components, and/or security patches. Likewise, and as previously explained, the remedial processing may including temporarily assigning the non-compliant host to a restricted network until compliance is achieved. Numerous remedial schemes can be employed.

Thus, policies received from the security service ensure that suspect applications are prevented from running on the endpoint (unless the user is given the option of running that application only as a low privileged user on a restricted network, having limited access to network resources). In addition, the enterprise server 105 at all times provides management (e.g., IT) with a full view of the currently installed applications and on what endpoints. This then enables management to tune or otherwise implement other security technologies like vulnerability assessment tools/services and firewalls on the basis of increasing frequency of use of certain applications within the enterprise. This also enables management to have better software management policies. For instance, if every new application is queried at the security server 105, for any rules that might be applicable to the application, the server 105 would always have a hit count (i.e., how many users in the enterprise are using that application). This hit count enables IT (or other management entity) to generate specific policies for most commonly used or frequently queried applications to suit desired security policies. If the enterprise does not create any policies around the various applications, the trust rating data (or the trust rating itself) from the content provider service can be used to decide the security settings for applications of an enterprise.

Methodology

Figure 3:
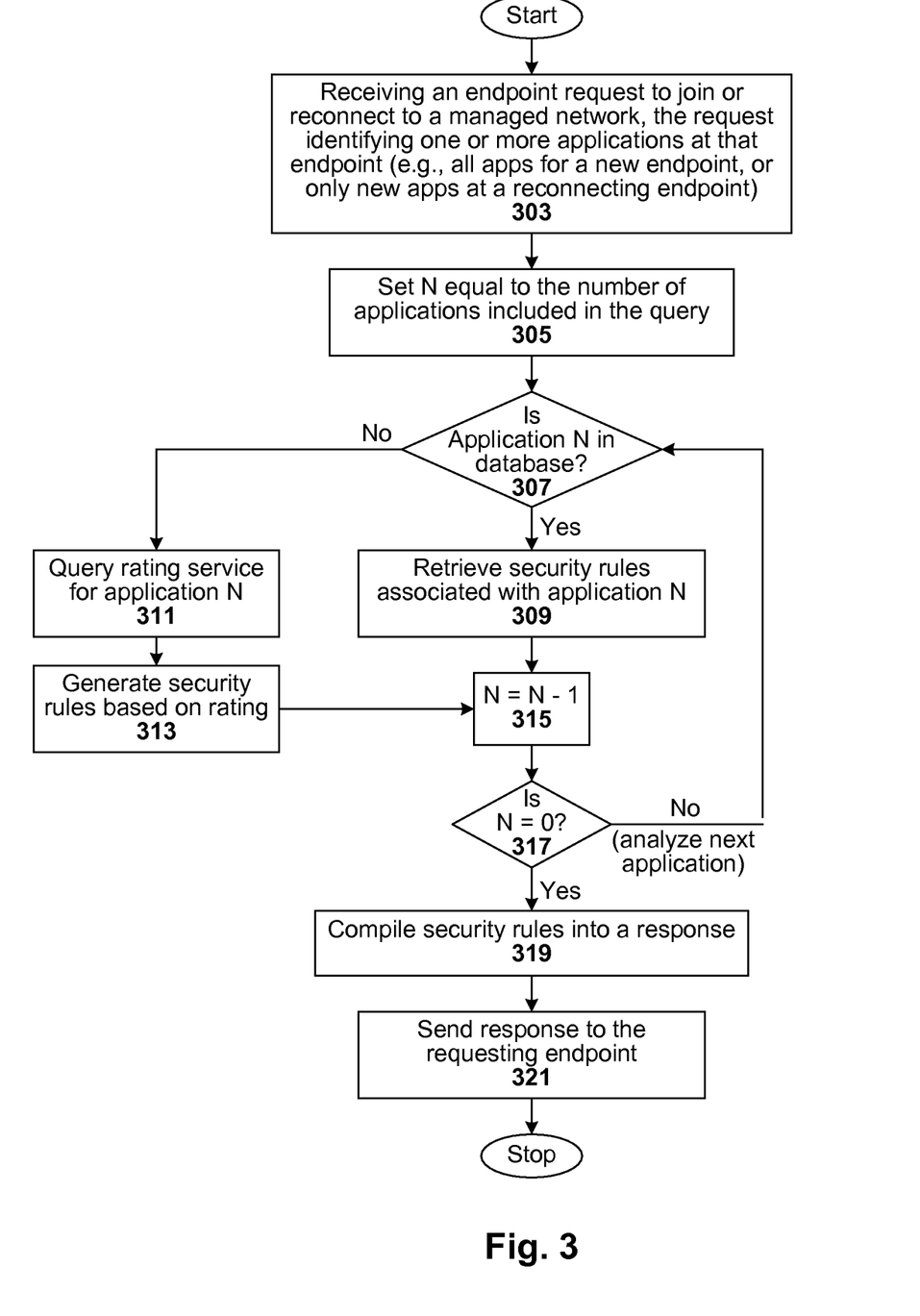
FIG. 3 illustrates a method for endpoint management configured in accordance with an embodiment of the present invention.

FIG. 3 illustrates a method for endpoint management in accordance with an embodiment of the present invention. This method can be carried out, for example, by the security service described with reference to FIG. 1. As previously explained, these modules can be implemented as executable code encoded on a machine-readable medium, in accordance with one particular embodiment.

The method begins with receiving 303 an endpoint request to join or reconnect to a managed network, the request identifying one or more applications installed at that endpoint. The applications may be identified, for example, by name, hash, path and/or other unique identifier. All applications at an endpoint can be identified (e.g., for a new endpoint), or only new applications can be identified (e.g., at a reconnecting or otherwise previously existing endpoint). In this particular embodiment, the method continues with setting 305 N equal to the number of applications identified in the query (so as to effectively assign each application a unique sequential number for processing purposes, as will be explained).

The method continues with determining 307 if application N is represented in the compliance policy database. This determination can be carried out, for example, by searching for the name of application N against a master list of application names included in the database. The compliance policy database can be indexed by application name, hash, or other unique ID, with each indexed entry having one or more security rules designated therein. In response to application N being represented in the compliance policy database, the method continues with retrieving 309 one or more security rules associated with that application N.

In response to application N not being represented in the compliance policy database, the method continues with querying 311 a content provider service to obtain application factors that can be used to compute a trust rating for application N, or to obtain a pre-computed trust rating for application N. The method then continues with generating 313 one or more security rules for application N, based on the trust rating. As previously explained, the content provider service can be encoded on a server that is configured for responding to the endpoint requests (e.g., where content provider service is a database or look-up table), or a $3^{rd}$ party service that provides content to the server (whether that content is in the form of trust ratings that can be used to compute security rules, or application factors that can used to compute trust ratings (which can then be used to compute security rules).

The method continues with decrementing 315 N (e.g., N=N-1), and determining 317 whether N is equal to zero. If not, then the next application N is processed in accordance with steps 307 through 317 as previously discussed. Note that this example configuration processes the applications in a sequential or serial process. In alternative embodiments, this application processing can be carried out in parallel, if so desired.

If N is equal to zero, then there are no other applications to process for the received endpoint request, and the method continues with compiling 319 the security rules into a response, and sending 321 the response to the requesting endpoint. The endpoint can then use those rules to properly comply with the security policies of the managed network. The compiling can be carried out, for example, by the module 115, server 105, or a compiling module.

Figure 4:
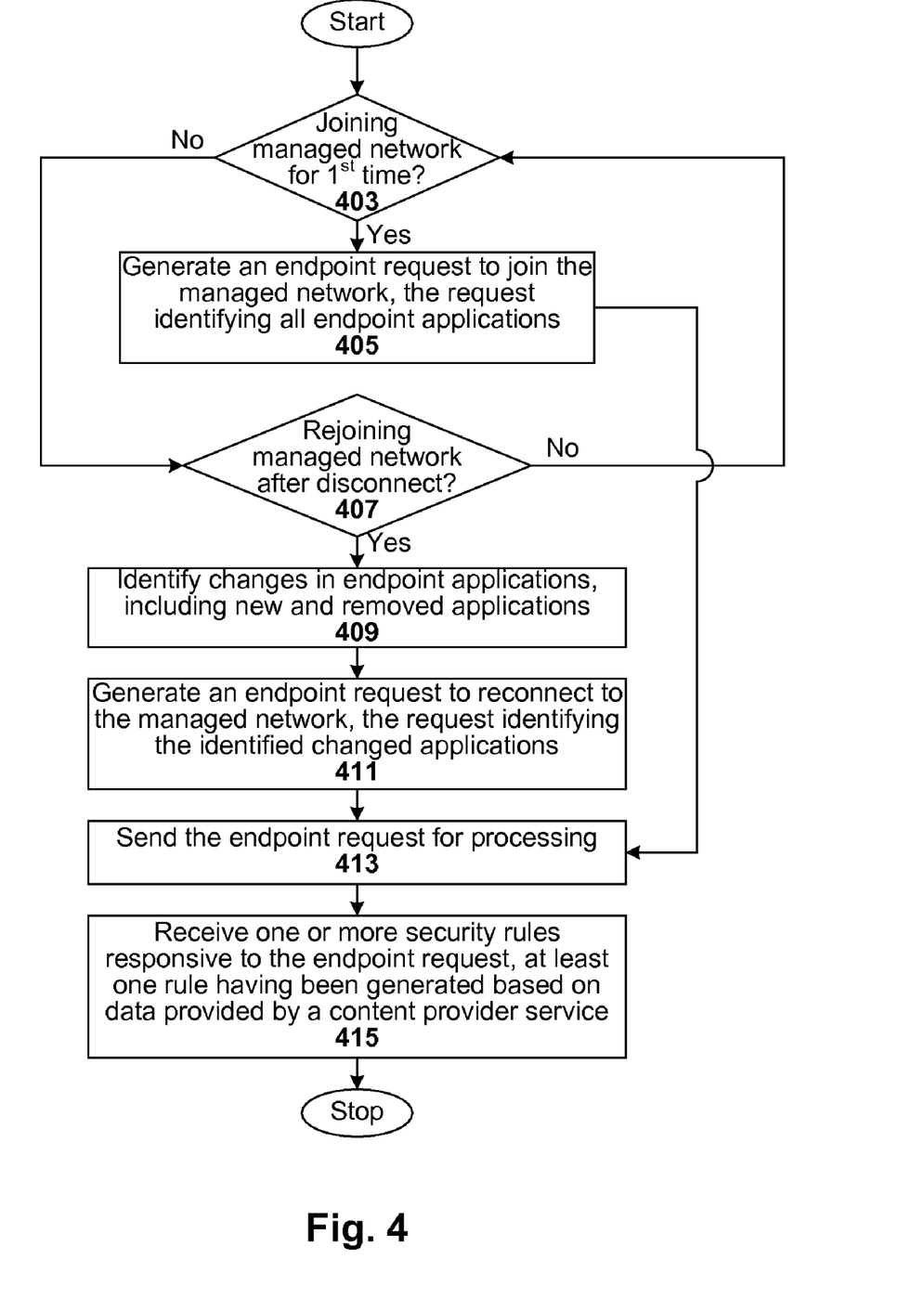
FIG. 4 illustrates a method for endpoint management configured in accordance with another embodiment of the present invention.

FIG. 4 illustrates a method for endpoint management in accordance with another embodiment of the present invention. This method can be carried out, for example, by an endpoint configured with the endpoint compliance module described with reference to FIGS. 1 and/or 2. As previously explained, these modules can be implemented as executable code encoded on a machine-readable medium, in accordance with one particular embodiment.

The method includes determining 403 if the corresponding endpoint is joining a managed network for the first time. If so, the method continues with generating 405 an endpoint request to join the managed network, the request identifying one or more endpoint applications installed at the endpoint.

If, on the other hand, the corresponding endpoint is not joining a managed network for the first time, then the method continues with determining 407 if the corresponding endpoint is rejoining a managed network after a disconnect. If not, then the example method of this embodiment continues to monitor for an endpoint that is attempting to join/rejoin the managed network (e.g., repeat steps 403 and 407 until a join/rejoin attempt is detected).

If, on the other hand, the corresponding endpoint is rejoining a managed network after a disconnect, then the method continues with identifying 409 changes in endpoint applications, including any new and/or removed applications. The method then proceeds with generating 411 an endpoint request to reconnect to the managed network, the request identifying the changed applications for the endpoint. Note that this request is incremental in nature, as it only indicates changed endpoint applications (as opposed to all endpoint applications).

Once an endpoint request is generated, the method continues with sending 413 the endpoint request for analysis. In one particular case, the analysis includes use of a content provider service to obtain one or more application factors that can be used to compute a trust rating for the application, or to obtain a pre-computed trust rating for the application. The method continues with receiving 415 one or more rules responsive to the endpoint request, with at least one rule having been generated based on the trust rating. As previously explained, an application trust rating can be computed based on a number of application factors that allow for deduction of an application's trustworthiness relevant to security policies of the managed network. The content provider service can provide the application factors and/or the application trust rating.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A non-transitory machine-readable medium encoded with instructions, that when executed by one or more processors, cause the processor to carry out a process for endpoint management, the process comprising:
   receiving from an endpoint an endpoint request to join a managed network, the endpoint identifying to a server in the request one or more applications currently on the endpoint;
   determining if the identified applications are represented in a compliance policy database, wherein the compliance policy database comprises a list of applications and one or more security policy rules associated with each application in the list of applications that impose required settings for the application that must be met for providing access to the managed network;
   in response to a determination that an identified application is not represented in the compliance policy database:
      querying a content provider service to obtain one or more factors for the application not represented in the compliance policy database for use in computing a trust rating for the application not represented in the compliance policy database, or a pre-computed trust rating for the application not represented in the compliance policy database;
      determining a trust rating for the application not represented in the compliance policy database based on the one or more factors for the application not represented in the compliance policy database or the pre-computed trust rating; and
      dynamically generating one or more security policy rules for the application represented in the compliance policy database based on the determined trust rating, the one or more security policy rules for use in a managed endpoint compliance scheme; and
   in response to a determination that an identified application is represented in the compliance policy database:
      retrieving the one or more security policy rules associated with the represented application from the compliance policy database.

2. The non-transitory machine-readable medium of claim 1, the process further comprising:
   compiling the one or more security policy rules into a response; and
   sending the response to the requesting endpoint.

3. The non-transitory machine-readable medium of claim 1 wherein the endpoint is joining the managed network for the first time, and the request identifies all applications at the endpoint.

4. The non-transitory machine-readable medium of claim 1 wherein the endpoint is rejoining the managed network after having been disconnected, and the request identifies only applications that have changed, including new applications.

5. The non-transitory machine-readable medium of claim 1 wherein querying a content provider service to obtain one or more factors for the application not represented in the compliance policy database includes polling a peer group of the endpoint and receiving responses from the peer group.

6. The non-transitory machine-readable medium of claim 1 wherein querying a content provider service to obtain one or more factors for the application not represented in the compliance policy database includes querying a storage that catalogues applications by unique ID and has one or more factors associated with each ID.

7. A non-transitory machine-readable medium encoded with instructions, that when executed by one or more processors, cause the processor to carry out a process for endpoint management, the process comprising:
   detecting a one or more applications on an endpoint;
   generating an endpoint request to join a managed network, the request identifying the one or more applications on the endpoint;
   sending the endpoint request from the endpoint to the managed network for analysis, the managed network configured to:
      determine if the identified applications are represented in a compliance policy database comprising a list of applications and one or more security policy rules associated with each application in the list of applications;
      responsive to a determination that an identified application is not represented in the compliance policy database, query a content provider service to obtain one or more factors for the application not represented in the compliance policy database used to compute a trust rating for the application not represented in the compliance policy database, or to obtain a pre-computed trust rating for the application not represented in the compliance policy database;
      determine a trust rating for the application not represented in the compliance policy database based on the one or more factors for the application not represented in the compliance policy database or the pre-computed trust rating; and
      dynamically generate one or more security policy rules for the application not represented in the compliance policy database based on the determined trust rating, the one or more security policy rules for use in a managed endpoint compliance scheme; and
   receiving from the managed network one or more security policy rules for each of the identified applications responsive to the endpoint request, with at least one of the security policy rules having been dynamically generated.

8. The non-transitory machine-readable medium of claim 7 wherein the endpoint is joining the managed network for the first time, and the endpoint request identifies all endpoint applications on the endpoint.

9. The non-transitory machine-readable medium of claim 7 wherein the request identifies only applications that have changed since a last time applications were identified, including new applications.

10. The non-transitory machine-readable medium of claim 7 further comprising:
    scanning the endpoint regularly for new applications or for applications that have changed since a previous scan; and
    dynamically updating a server with each of the new applications on the endpoint.

11. The non-transitory machine-readable medium of claim 7 further comprising:
    indexing the applications on the endpoint, excluding applications that are known to be trusted applications;
    monitoring for new applications; and
    responsive to detecting a new application, capturing one or more attributes about the application and capturing system information at a time of detection of the new application.

12. A system for endpoint management, comprising:
    a server comprising a non-transitory machine-readable medium encoded with instructions and a processor configured to execute the instructions, the instructions configured to cause the server to:
       receive from an endpoint an endpoint request to join a managed network, the endpoint identifying to the server in the request one or more applications currently on the endpoint;
       determine if the identified applications are represented in a compliance policy database, wherein the compliance policy database comprises a list of applications and one or more security policy rules associated with each application in the list of applications that impose required settings for the application that must be met for providing access to the managed network;
       in response to a determination that an identified application is not represented in the compliance policy database:
          query a content provider service to obtain one or more factors for the application not represented in the compliance policy database for use in computing a trust rating for the application not represented in the compliance policy database or a pre-computed trust rating for the application not represented in the compliance policy database;
          determine a trust rating for the application not represented in the compliance policy database based on the one or more factors for the application not represented in the compliance policy database or the pre-computed trust rating; and
          dynamically generate one or more security policy rules for the application not represented in the compliance policy database based on the determined trust rating, the one or more security policy rules for use in a managed endpoint compliance scheme; and
       in response to a determination that an identified application is represented in the compliance policy database:
          retrieve the one or more security policy rules associated with the represented application from the compliance policy database.

13. The system of claim 12, wherein the instructions are further configured to cause the server to
    compile the one or more security policy rules into a response; and
    send the response to the requesting endpoint.

14. The system of claim 12 wherein querying the content provider service includes at least one of polling a peer group of the endpoint and querying a storage that catalogues applications by unique ID and has one or more application factors associated with each ID.

15. The system of claim 12 wherein the endpoint is joining the managed network for the first time, and the endpoint request received by the server identifies all endpoint applications on the endpoint.

16. The non-transitory machine-readable medium of claim 1, wherein each of the one or more applications currently on the endpoint comprises an application installed on the endpoint.

17. The non-transitory machine-readable medium of claim 7, wherein each of the one or more applications on the endpoint comprises an application installed on the endpoint.

18. The system of claim 12, wherein each of the one or more applications currently on the endpoint comprises an application installed on the endpoint.

* * * * *